United States Patent [19]

Barton

[11] Patent Number: 4,487,914

[45] Date of Patent: Dec. 11, 1984

[54] CURING AGENTS FOR EPOXY RESINS

[75] Inventor: John M. Barton, Farnham, England

[73] Assignee: National Research Development Corporation, London, England

[21] Appl. No.: 580,704

[22] Filed: Feb. 16, 1984

[30] Foreign Application Priority Data

Feb. 18, 1983 [GB] United Kingdom ............... 8304581

[51] Int. Cl.$^3$ ............................................. C08G 59/68
[52] U.S. Cl. ..................................... 528/92; 525/504;
528/94; 528/97; 528/111; 528/117; 528/361;
528/407; 528/409; 528/410; 528/411; 528/412;
528/413; 528/414; 528/416
[58] Field of Search ............... 528/92, 94, 117, 361,
528/97, 111, 407, 410, 412, 413, 414, 411, 409,
416; 525/504

[56] References Cited

U.S. PATENT DOCUMENTS

| | | | |
|---|---|---|---|
| 3,553,166 | 1/1971 | Anderson et al. | 528/117 |
| 3,677,978 | 7/1972 | Dowbenko et al. | 528/94 X |
| 3,678,007 | 7/1972 | Dowbenko et al. | 528/92 |
| 3,756,984 | 9/1973 | Klaren et al. | 528/94 |
| 3,792,016 | 2/1974 | Hill et al. | 528/92 |
| 4,358,571 | 11/1982 | Kaufman et al. | 528/94 X |

*Primary Examiner*—Earl A. Nielsen
*Attorney, Agent, or Firm*—Cushman, Darby & Cushman

[57] ABSTRACT

A curable composition comprising an epoxy resin or a monoepoxide and a curing agent comprising a metal salt complex of an adduct of an imidazole and a monofunctional epoxy compound.

15 Claims, No Drawings

CURING AGENTS FOR EPOXY RESINS

The present invention relates to compounds suitable for curing epoxy resins.

An epoxy resin may be converted into a cross-linked, infusible, intractable polymer by means of a suitable curing agent. The resin and curing agent may constitute a one part system in which the two components are stored as a mixture ready for use or the resin and curing agent may constitute a two part system in which the two components are stored separately until immediately prior to use. One part systems have considerable advantages over two part systems in that they are usually cheaper and easier to use and do not suffer from the attendant difficulties associated with two part systems which require that the two components are mixed in the correct proportions and in the correct quantity just prior to use. The present invention is concerned with one part systems.

The requirements of a curing agent intended for a one part system include that it is relatively unreactive with epoxy resins at room temperature so that the resin/curing agent mixture is stable until the temperature is raised to effect curing. It is necessary that the curing agent does not cause premature curing of the resin when the system is stored for a long period of time ie it is highly desirable that the system has a long pot-life.

Imidazoles are known curing agents for epoxy resins, but they cannot be used in one part systems because they are highly reactive with epoxies. One way round this problem has been to complex the imidazole with a metal salt which produces a curing agent which may be used with an epoxy in a one part system which may be stored without premature curing taking place. Such imidazole/metal salt complexes are disclosed in UK patent specification No. 1204834. However such complexes have the disadvantages of being crystalline materials with very low solubilities in epoxy resins. Solubility of a curing agent in an epoxy resin is very desirable when it is used in a one part system. With crystalline curing agents as described in UKP No. 1204834 a heterogeneous dispersion is obtained when the curing agent is mixed with the resin. Such dispersions have a tendency to settle out or agglomerate during prolonged storage. Moreover such dispersions are not ideal for manufacturing pre-impregnated composite materials (pre-pregs).

According to the present invention in a first aspect there is provided a curable composition comprising an epoxy resin or a monoepoxide and a curing agent comprising a metal salt complex of an imidazole derivative which is an adduct of an imidazole and a monofunctional epoxy compound.

The imidazole-epoxy adduct can be formed from essentially any imidazole or mixture of imidazoles. By "an imidazole" is meant imidaxole itself or any substituted imidazole.

By "monofunctional" is meant containing one

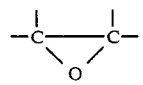

grouping.

Examples of substituted imidazoles that may be used include alkyl imidazoles, such as 1-methylimidazole, 1,2-dimethylimidazole, 2-methylimidazole, 2-ethylimidazole and 2-ethyl-4-methylimidazole, carbamylalkyl-substituted imidazoles such as 1-(2-carbamethyl)imidazole and 1-(2-carbameylethyl)-2-ethyl-4-methylimidazole; alkaryl-substituted imidazoles, such as 1-benzyl-2-methylimidazole and 1-phenyl-2-methylimidazole; alkenyl-substituted imidazoles such as 1-vinyl-2-methylimidazole; allyl-substituted imidazoles such as 1-allyl-2-ethyl-4-methylimidazole; carboxanilide-substituted imidazoles, such as 1-imidazolecarboxanilide and 2-methyl-1-imidazolecarboxanilide; benzimidazoles, naphthimidazoles; polymidazoles; carbohydroxyethyl amine; wth o-phenylenediamine and others, such as 1-p-toluene; mixed imidazoles, such as imidazole and 1-methylimidazole and others may also be used to form imidazole/epoxy adducts which are complexed with metal salts to form the curing agent used in the composition of the first aspect.

Imidazole and 2-ethyl 4 (5)-methylimidazole are the preferred imidazoles.

It is preferred that the monofunctional epoxy compound from which the imidazole/epoxy adduct is fromed is an epoxy containing not more than 20 carbon atoms. Preferably, this expoxy compound is a glycidyl ether such a phenylglycidyl ether.

The molar ratio of imidazole:epoxy used in the formation of the adduct in the complex used in the composition of the first aspect may be 1:1 or 1:2, eg as shown in Formulae 1 and 2.

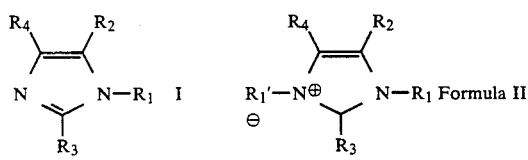

wherein $R_1$ and $R'_1$ are radicals provided by the epoxy/imidazole addition reaction and $R_2$, $R_3$ and $R_4$ are hydrogen or substituent groups eg alkyl or aryl groups preferably having less than 10 carbon atoms.

For example, the adducts of formulae I and II may have formulae:

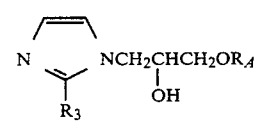

Formula Ia

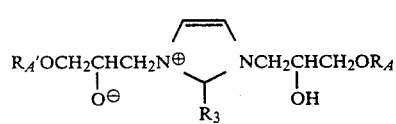

Formula IIa wherein $R_A$ and $R'_A$ are $C_{1-10}$ alkyl or, preferably, optionally substituted phenyl radicals.

Because of the tautomeric nature of imidazoles with an unsubstituted imin-nitrogen atom the epoxy adducts formed from such imidazoles are likely to be produced in a mixture of two isomeric forms. For example, where one of the groups $R_4$ and $R_5$ in formulae I and II is hydrogen and the other is a substituent group the adduct is likely to be formed in two isomeric forms, one with the in which the substituent group is in the imidazole 4-position and the other in which the substituent group is in the imidazole 5-position.

It is preferred that the molar ratio of epoxy to imidazole used in the formation of the adduct is no greater than 2:1, ie with only one functional epoxy residue attached to each nitrogen atom and not for example with poly epoxies, as the effectiveness of the complex would be reduced, in effect, by diluting the effectiveness of the curing agent with a greater molar ratio.

Essentially any metal salt may be use in the complex of the metal salt and the imidazole/epoxy adduct.

Examples of metal salts are copper salts such as cupric chloride, cuprous chloride, cupric bromide, cupric fluoride, cupric nitrate, cupric fluoborate, and cupric slufate, cuprice acetate, cupric trifluoracetate, cupric methacrylate, cupric stearate, cupric octoate, cupric malonate, cupric benzoate, nickel salts such as nickel chloride, nickel fluoride, nickel sulphate and nickel fluorborate, nickel tallate, nickel stearate and castor oil acid salts of nickel, calcium salts such as calcium chloride and calcium bromide; cobalt salts such as cobaltous chloride, cobaltous fluoride, cobaltous sulphate; cobaltous stearate, cabaltous octoate and cobaltous fluoborate; zinc salts such as zonc bromide, zinc stearate, zinc octoate, zinc-2-ethylhexoate, zince chromoate and zinc chloride; mecury salts such as mercuric bromide and mercuric chloride; zirconium salts such as zirconium sulfate, indium salts such as indium fluoborate; silver salts such as silver nitrate; chromium salts such as chromic chloride; manganese salts such as manganese chloride and manganese sulfate; tin salts such as stannous chloride; cadmium salts such as cadmium chloride; iron salts such as ferrous chloride, and titanium salts such as titanium chlorides.

Preferred metal salts include $CuCl_2$, $CuBr_2$, $Cu(NO_3)_2$, copper acetate, copper propionate, $CaCl_2$, $ZnCl_2$ and cadmium acetate.

It is understood that the above metal salts are but a few of the metal salts that may be used.

The metal salt to imidazole/epoxy adduct molar ratio is not critical. Generally, however, the metal salt to imidazole/epoxy adduct molar ratio is between 1:1 and 1:6 preferably 1:4.

The complexes of imidazole/epoxy adducts and metal salts are conveniently formed by mixing the ingredients. If any of the ingredients are solids, solutions of the reactants in a solvent such as methanol or water may be used. If the product is solid, one may filter the resultion precipitate to obtain the complex.

The compositions embodying the first aspect of this invention are epoxy resins or monoepoxides with the above-mentioned imidazole metal salt complexes as curing agents. The composition may be formed by merely mixing the imidazole/epoxy complex with the epoxy resins or monoepoxides, with or without the use of solvents, and the ingredients may be mixed together at room temperature.

Any epoxy resin or monoepoxide may be cured by blending the epoxy resin or monoepoxide with the metal salt complex of imidazole/epoxy and heating the blend from about 200° F. to about 500° F. The epoxy resins or monoepoxides may be saturated or unsaturated, cycloaliphatic, heterocyclic or aliphatic and may be substituted, if desired, with substituents such as halogen atoms, sulfur atoms, esters, urethanes, amino groups, hydroxyl groups, ether radicals, mercapto groups, acids, anhydrides, ketones and aldehydes. They may also be monomeric or polymeric. They may also be used in the presence of compounds or resins containing halogen atoms, sulphur atoms, hydroxy groups, mercapto groups, ether radicals, amino groups, acid groups, anhydrides, esters, urethanes, ketones, and aldehyde groups.

The term "epoxy resin" used herein applies to polyepoxides. Monoepoxides also polymerize when blended with the metal salt complexes of imidazole/epoxy and heated. Examples of monoepoxides which polymerize upon the addition of metal salt complexes of imidazole/epoxy and heat are propylene oxide, allyl glycidyl ether, phenyl glycidyl ether, pentachlorophenyl glycidyl ether, tetrabromophenyl glycidyl ether and glycidyl methacrylate. In the preferred embodiments the epoxy resins are polyepoxides having an average of more than 1.0 1,2-epoxy groups per average molecular weight. Among the polyepoxides which can be used herein are the polyglycidyl ethers of polyphenols, such as Bisphenol A. These may be attained, for example, by etherification of a polyphenol with epichlorohydrin or dichlorohydrin in the presence of an alkali. The phenolic compound may be 2,2-bis(4-hydroxyphenyl)propane, 4,4'-dihydroxybenzophenone, 1,1-bis(4-hydroxyphenyl)ethane, 2,2-bis(4-hydroxy-tertiarybutylphenyl)propane, bis(2-hydroxynaphthyl)methane or 1,5-dihydroxynaphthalene. The polyphenol can also be a novolak resin.

Examples of this class of polyepoxides are the reaction products of Bisphenol A and epichlorohydrin.

Also suitable are the similar polyglycidyl ethers of polyhydric alchohols which may be derived from such polyhydric alcohols as ethylene glycol, diethylene glycol, triethylene glycol, 1,2-propylene glycol, 1,4-butylene glycol, 1,5-pentanediol, 2,4,6-hexanetriol, glycerol and trimethylolpropane.

Other examples of polyepoxides that may be used in this invention are the partial fatty acid esters of the above-mentioned glycidyl polyethers of polyhydric alcohols and glycidyl polyethers of polyhydric phenols. Linseed oil and castor oil are examples of fatty acids that may be used to produce these resins.

Also suitable are polyglycidyl esters of polycarboxylic acids which are produced by the reaction of epichlorohydrin or a similar epoxy compound with an aliphatic or aromatic polycarboxylic acid, such as oxalic acid, succinic acid, glutaric acid, adipic acid, azelaic acid, phthalic acid, isophthalic acid, terphthalic acid, 2,5-naphthalenedicarboxylic acid and dimerized linolenic acid. Examples are diglycidyl adipate and diglycidyl phthalate, and similar esters.

Other examples are polyepoxides derived from the epoxidation of olefinically unsaturated aliphatic compounds. Included are diepoxides and higher epoxides, as well as mixtures of epoxides comprising in part one or more monoepoxides. These polyepoxides are non-phenolic and are obtained by epoxidation of olefins such as butadiene and cyclohexene, for example, by oxygen and selected metal catalysts by perbenzoic acid, by acetaldehyde monoperacetate, or by peractic acid.

The ratio of the metal salt complex of an imidazole/epoxy adduct to the epoxy resin is not critical. Generally, the blend contains from about 0.5 to about 40 parts by weight of metal salt complex to 100 parts by weight of epoxy resin.

When the epoxy resin or monoepoxide and the metal salt complex of the imidazole are blended together, the composition may be stored at room temperature for long periods of time without curing. It the epoxy resin is to be used as a sheet material, it may be heated for the period of time necessary to form a hard gelled material.

If the epoxy blend is to be used as a coating or adhesive, the blend is coated onto the substrate and then heated for a period of time long enough to cure the resin to a tough adherent coating on the substrate. The amount of heat needed to cure the epoxy blends depends upon the particular components, but generally the blends are heated to approximately 90° C. to 250° C. until the resin cures.

If faster curing of the resin and improved high temperature strength is desired, the epoxy resin or monoepoxide may be blended with mixtures of the above-described metal salt complexes and nitrogenous compounds.

These compositions can be formed by merely mixing the complex and the nitrogenous compound with the epoxy resin or monoepoxide.

The ratio of curing agent to epoxy resin or monepoxide is the same as in the case where the nitrogenous compound is not added. The curing agent may contain any proportion of imidazole complex to nitrogenous compounds. The best results, however, are obtained using curing agents containing from 1 to 98 percent by weight of the nitrogenous compound.

Examples of nitrogenous compounds include aromatic polyamines such as bis(4-aminophenyl)sulphone.

Thus, the metal salt imidazole/epoxy adducts may be used as soluble accelerators with other curing agents such as the aforementioned nitrogenous compounds.

Pigments such as titanium dioxide, carbon black, and the like, fillers and flexibilizing agents, may be added to the epoxy resin compositions. It is also possible to include in the compositions of this invention other resinous materials co-reactive with epoxy resins such as resins containing carboxyl groups such as axelaic acid, resins containing anhydrides such as "Nadic" anhydride (NADIC is a Trade Mark), polyesters containing epoxy groups, resins containing hydroxyl groups, thio groups, silicon resins containing epoxy groups, such as urethane resins, and resins containing amino groups. The addition of the above co-reactants may be used to impart various known desirable properties to the epoxy resin compositions.

The metal salt imidazole/epoxy adduct complexes used in composition according to the first aspect of the persent invention are curing agents which are generally more soluble in epoxy resins than known metal salt imidazole complexes. The first mentioned complexes are also relatively soluble in organic solvents and are generally unreactive with epoxy resins at room temperature but are effective as curing agents in one part epoxy systems (one part compositions) at higher temperatures, eg above about 100° C. Such compositions may, as noted above be stored for long periods of time without premature curing taking place and without the formation of agglomerates and the setting out of the curing agent.

According to the present invention in a second aspect there is provided a novel metal salt imidazole/epoxy complex suitable for use as or as the curing agent in the composition according to the first aspect. The metal salt complex may be any of the novel metal salt imidazole/epoxy complexes specified above.

Embodiments of the present invention will now be described by way of example.

EXAMPLE 1

Preparation of 1:1 molar adduct of imidazole (Im) and phenylglycidyl ether (PGE)

To a stirred refluxing solution of imidazole (17 g, 0.25 mole) in bezene (200 cm$^3$) was added, during a period of one hour, a solution of phenyl glycidyl ether (37.5 g, 0.25 mole) in benzene (50 cm$^3$). The reaction mixture was kept under reflux for a further hour and the solvent was then removed on a rotary evaporator. A pale yellow, slightly opaque, viscous product was obtained, in a yield of 52.5 g.

EXAMPLE 2

Preparation of 1:1 molar adduct of 2-ethyl-4(5) methylimidazole (EMI) and PGE

To a stirred refluxing solution of 2-ethyl-4-methylimidazole (27.5 g; 0.25 mole) in toluene (200 cm$^3$) was added, during one hour, a solution of phenyl glycidyl ether (37.5 g; 0.25 mole) in toluene (50 cm$^3$). The reaction mixture was maintained at reflux for a further two hours and then allowed to cool. The product was precipitated and washed with p. eth. 40–60 and dried in a vacuum oven at 40°. An orange viscous product was obtained, in a yield of 45.6 g.

EXAMPLE 3

Preparation of 1:2 molar adduct of EMI and PGE

To a stirred refluxing solution of 2-ethyl-4-methylimidazole (11 g; 0.1 mole) in toluene (100 cm$^3$) was added, druing two hours, a solution of phenyl glycidyl ether (30 g; 0.2 mole) in toluene (50 cm$^3$). The reaction mixture was maintained at reflux for a further hour and allowed to cool. The brown viscous product was precipitated and washed with p. eth. 40–60 and dried in a vacuum oven at 40°. The yield was 33.5 g.

EXAMPLE 4

Preparation of the complex (Cu (PGE.IM)$_4$CP$_2$) from the 1:1 molar adduct of PGE and Im with CuCl$_2$ To a solution of the adduct, PGE.IM, (15.7 g; 0.0720 mole) in methanol (50 cm$^3$) was added, with stirring, a solution of CuCl$_2$.2H$_2$O (3.05; 0.01794 mole) in methanol (25 cm$^3$). A pale blue precipitate formed initially which then dissolved on addition of further CuCl$_2$/methanol solution to give a dark blue solution. The solution was reduced in volume and finally dried in a vacuum oven at 40°. A dark blue, brittle, product was obtained.

EXAMPLE 5

Preparation of the complex, Cu (PGE.EMI)4Cl$_2$, from the 1:1 molar adduct of PGE and EMI with CuCl$_2$ To a solution of the adduct, PGE.EMI, (10.00 g, 0.0385 mole) in methanol (50 cm$^3$) was added, with stirring, a solution of CuCl$_2$.2H$_2$O (1.6346 g, 0.0096 mole) in methanol (20 cm$^3$). After slow evaporation of the solvent over 16 hours, a dark green residue was obtained. Drying in a vacuum oven at 40°, produced a dark blue, brittle, resinous product (9.4 g).

EXAMPLE 6

Preparation of the complex, Cu(PGE$_2$.EMI) 4CP$_2$, from the 2:1 molar adduct of PGE and EMI with CuCl$_2$ To a solution of the adduct, PGE$_2$. EMI (9.69 g; 0.0236 mole) in methanol (40 cm$^3$) was added, with stirring, a solution of CuCl$_2$.2H$_2$O (1.0044 g; 0.0059 mole) in methanol (10 cm$^3$). The resultant dark green solution was evaporated to give a green resinous material which was finally dried in a vacuum oven at 40°. The product was a dark green extremely viscous resinous material.

EXAMPLE 7

Preparation of complexes from the 2:1 molar adduct of PGE and EMI

To an accurately weighed sample (about 2 g) of the adduct, PGF$_2$.EMI, dissolved in methanol (5 cm$^3$) was added, with stirring, a solution of an accurately weighed sample of the metal salt, to give the required stoichiometry, in methanol (approx 10 cm$^3$). The solvent was allowed to evaporate at room temperature and the final traces were removed in vacuo at 50° C. A summary of the compositions of the various complexes is given in Table 1.

EXAMPLE 8

Experiments on the assessment of the activity of the complexes as curing agents for the epoxy resin, Shell Epikote 828 (trade name)

Epikote 828 is an example of the class of polyepoxides formed from the reaction of bisphenol-A with epichlorhydrin. The complexes prepared in the previous Examples 6 and 7 were incorporated in the samples of resin to give compositions containing approximately 5 parts per hundred parts of resin by weight (pph). To an accurately weighed sample of the complex (about 0.05 g) was added an accurately weighed sample of epoxy resin, to give a complex concentration of 5.0 pph, followed by acetone (about 5 cm$^3$). The mixture was stirred with gentle warming when necessary, until the complex had dissolved. The acetone was then removed in a vacuum oven at 50° C.

Samples of the mixtures (10–30 mg) in aluminium pans were scanned in a Dupont 910 differential scanning calorimeter (DSC) at a heating rate of 10 k/min. The output from the instrument is a plot of heat flow against temperature. Cure of the resin is characterised by an exotherm which is seen as a peak, or series of peaks, in the output. The first onset of the exotherm above the initial baseline is used as a measure of the onset of cure, and any subsequent peaks in the heat flow output are taken as characteristic of the curing reaction. The results for various complexes are included in Table 1.

EXAMPLE 9

Cure of the epoxy resin, MY720 (Ciba-Geigy)

The resin MY720 is a member of another important class of polyepoxides, the polyglycidylamines. MY720 is believed to be largely tetra-N-glycidyl-bis(4-aminophenyl)methane.

To a sample of the resin (0.982 g) was added the complex of composition Cu (PGE.EMI)4Cl$_2$ ((0.054 g) and a solution was obtained by heating to 100° C. and stirring for a few minutes. A sample was scanned in the DSC at a heating rate of 10 K/min. A large curing exotherm was observed with an onset of 102° C. A second sample was cured in an aluminium pan in an oven at 200° C. for 2 hours. This was then scanned in the DSC at 20 K/min to show the endothermic inflection, which is characteristic of the glass transition temperature at 208° C., indicating a high degree of cure.

EXAMPLE 10

MY720 resin is often cured with aromatic polyamines, and in particular bis(4-aminopnenyl)sulphone(-BAPS) is often used for this purpose. Because of the low reactivity of BAPS an accelerator is usually added, for example, the complex of borontrifluoride and ethylamine.

MY720 resin (2.459 g) and BAPS (0.738 g) were mixed for 15 minutes at 135° C. to give a solution. To the mixture was added the complex of composition Cu(PGE.EMI)4Cl$_2$ (0.114 g), with stirring at 135° C. for about 2 minutes, to give a solution. A 28.2 mg sample was weighed into an aluminium pan and scanned in the DSC at 10 K/min heating rate, from 40° C. to 290° C. The onset of the curing exotherm was observed at about 110° C. and the temperature of the peak of the exotherm was at about 200° C. A second scan on the sample at a heating rate of 20 K/min indicated a glass transition temperature of 189° C., demonstrating that a high degree of cure had been obtained.

A similar experiment with no complex present gave an onset of cure at about 160° C. and an exotherm peak at about 260° C. This demonstrated that the complex is an effective accelerator for the curing reaction.

TABLE I

| COMPOSITIONS OF COMPLEXES AND RESIN CURE EXOTHERM CHARACTERISTICS | | | | | |
|---|---|---|---|---|---|
| COMPOSITION | | MILE RATIO | CURE ONSET | CURE EXOTHERM PEAK TEMPERATURES (°C.) | |
| ADDUCT | METAL SALT | ADDUCT:SALT | TEMP (°C.) | 1 | 2 |
| PGE.Im | CaCl$_2$ | 4 | 75 | 240 | — |
| PGE.EMI | CuCl$_2$ | 4 | 85 | 155 | 240 |
| (PGE)$_2$—EMI | CuCl$_2$ | 4 | 100 | 155 | 262 |
| (PGE)$_2$—EMI | CuBr$_2$ | 4 | 110 | 160 | 272 |
| (PGE)$_2$—EMI | Cu(NO$_3$)$_2$ | 4 | 105 | 162 | 225 |
| (PGE)$_2$—EMI | Cu Acetate | 4 | 80 | 150 | 297 |
| (PGE)$_2$—EMI | Cu Propionate | 4 | 80 | 150 | 300 |
| (PGE)$_2$—EMI | CaCl$_2$ | 4 | 182 | 245 | — |
| (PGE)$_2$—EMI | CoCl$_2$ | 2 | 105 | 232 | — |
| (PGE)$_2$—EMI | CoCl$_2$ | 4 | 115 | 235 | — |
| (PGE)$_2$—EMI | CoCl$_2$ | 6 | 110 | 130 | 250 |
| (PGE)$_2$—EMI | ZuCl$_2$ | 4 | 110 | 115 | 230 |

TABLE I-continued

COMPOSITIONS OF COMPLEXES AND RESIN CURE EXOTHERM CHARACTERISTICS

| COMPOSITION | | MILE RATIO | CURE ONSET | CURE EXOTHERM PEAK TEMPERATURES (°C.) | |
|---|---|---|---|---|---|
| ADDUCT | METAL SALT | ADDUCT:SALT | TEMP (°C.) | 1 | 2 |
| (PGE)$_2$—EMI | Cd Acetate | 4 | 90 | 135 | 265[A] |

A - An intermediate peak at 170° C. was also observed.

I claim:

1. A curable composition comprising an epoxy resin or a monoepoxide and a curing agent comprising a metal salt complex of an adduct of an imidazole and a monofunctional epoxy compound.

2. A composition as claimed in claim 1 and wherein the adduct is formed from imidazole or 2-ethyl-4-methylimidazole.

3. A composition as claimed in claim 1 and wherein the adduct is formed from an epoxy compound containing up to 20 carbon atoms.

4. A composition as claimed in claim 3 and wherein the epoxy compound is a glycidyl ether.

5. A composition as claimed in claim 4 and wherein the epoxy compound is phenylglycidyl ether.

6. A composition as claimed in claim 1 and wherein the molar ratio of the imidazole to epoxy used in the formation of the adduct is 1:1 or 1:2.

7. A composition as claimed in claim 1 and wherein the metal salt used in the formation of the complex is selected from CuCl$_2$, CuBr$_2$, Cu(NO$_3$)$_2$, copper acetate, copper propionate, CaCl$_2$, CoCl$_2$, ZnCl$_2$ and cadmium acetate.

8. A composition as claimed in claim 1 and wherein the metal salt to adduct molar ratio used in the formation of the complex is between 1:1 and 1:6.

9. A composition as claimed in claim 1 and wherein the curing agent additionally comprises at least one nitrogenous compound.

10. A composition as claimed in claim 9 and wherein the curing agent additionally comprises at least one aromatic polyamine.

11. A composition as claimed in claim 1 and wherein the ratio of the complex to the epoxy resin or monoepoxide is from 0.5 to 40 parts weight of the complex to each 100 parts by weight of the epoxy resin or monoepoxide.

12. A complex suitable for use in or as the curing agent in the composition specified in claim 1 the complex being a complex of a metal salt and an adduct of an imidazole with a monofunctional epoxy compound having not more than 20 carbon atoms.

13. A complex as claimed in claim 12 and wherein the said epoxy compound is a glycidyl ether.

14. A complex as claimed in claim 14 and wherein the said epoxy compound is phenylglycidyl ether.

15. A complex as claimed in claim 14 and wherein the imidazole is selected from imidazole and 2-ethyl-4-methylimidazole.

* * * * *